Patented May 2, 1933

1,906,934

UNITED STATES PATENT OFFICE

WILLEM P. TER HORST, OF PACKANACK LAKE, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing. Application filed December 4, 1929. Serial No. 411,665.

This invention relates to the treatment of rubber and similar materials, more particularly to a treatment of the same with the reaction product of a ketone and certain aromatic amine or amino compounds. The invention also relates to the products of such treatment.

An object of this invention is to provide materials having the property of retarding the deterioration of rubber. Other objects will be apparent from the following detailed description.

Examples of reaction products of ketones and aromatic amino compounds—acetone-p, p′-diamino diphenyl methane, acetone-diortho tolyl guanidine, acetone-diphenyl guanidine, acetone-p, p′-di(naphthylamino) diphenyl methane, acetone-diphenyl diamino ethane, methyl ethyl ketone-p, p′-diamino diphenyl methane, ethylidene-acetone-p, p′-diamino diphenyl methane.

Instead of the ketones mentioned above the following may be used: phorone, diethyl ketone, benzo phenone, aceto-phenone, dichlor acetone, aldol acetone, allyl-acetone, benzal acetone, diacetyl, acetyl-acetone, acetonyl-acetone, salicylaldehyde-acetone, furfural-acetone. Instead of the aromatic amino compounds mentioned above there may be used amino diphenyl, dinaphthylamines, asymmetric diphenyl hydrazine, diamino diphenyl sulphide, diamino diphenyl polysulphides, diamino dinaphthyl sulfides, p-amino benzyl-aniline, dinaphthyl diamino ethane, ditolyl diamino ethane, p-amino-p′naphthyl-amino diphenyl methane, p-p′-diamino diphenyl dimethyl methane, p-p′ dinaphthyl amino diphenyl dimethyl methane, phenyl beta naphthyl guanidine, phenyl o-tolyl guanidine, di-o-tolyl biguanide, diphenyl biguanide.

The reaction may be carried out with or without the aid of a dehydrating agent. The following chemicals or mixtures thereof may be used as dehydrating agents: calcium chloride, iodine, sulfanilic acid, phosphorous pentoxide, sodium hydroxide, magnesium perchlorate, acetic acid, barium oxide, zinc chloride, hydrochloric acid, sulfuric acid, etc. It is an advantage to use the amine-addition product with zinc chloride, for example $(C_6H_5NH_2)_2, ZnCl_2$, as a dehydrating agent.

The following are to be understood as illustrative embodiments of the invention and not limiting thereof:

*Example 1.*—The reaction product of acetone and p-p′ diamino-diphenyl methane is made by refluxing a mixture of 1 mole of diamino-diphenyl methane and substantially 6 moles of acetone and a trace of iodine during six hours or longer. The material is tested in the same manner as described above and the results are as follows:

| Green tensiles | +reaction product | Blank |
|---|---|---|
| (cure) 60′ at 45#  | 4160 | 4445 |
| (cure) 75′ at 45#  | 4125 | 4200 |
| (cure) 90′ at 45#  | 4455 | 4500 |
| Aged 168 hrs. in oxygen | | |
| (cure) 60′ at 45#  | 3120 | 1285 |
| (cure) 75′ at 45#  | 3180 | 1250 |
| (cure) 90′ at 45#  | 2890 | 1605 |

Instead of refluxing, in some cases it is advantageous to heat the amine or amino compound and acetone in an autoclave, at temperatures of from 56° C. to 250° C., or even higher. The relative proportions of acetone and amine or amino compound can be varied over a wide range, for instance from approximately ½ to 10 moles of ketone to 1 mole of amine.

*Example 2.*—50 parts of methyl-ethyl ketone, 50 parts of p-p′ diamino-diphenyl methane and .002 parts of iodine are refluxed during 16 hours. At the end of this time 38 parts of unreacted methyl ethyl ketone are recovered by distillation. The amount of water which is split off during the reaction amounts to approximately 3.5 parts. The weight of the reaction product is 54 parts. 1½ parts of the reaction product are incorporated in the usual manner by mixing on a rubber mill in a standard tire tread compound containing 100 parts of rubber, 1 part of hexamethylene tetramine, .25 parts of diphenyl guanidine, and 50 parts of carbon black. A similar mix is prepared from which the reaction product is omitted. The two stocks are vulcanized in a mold for 60 minutes at 45 pounds steam pressure per sq. inch. The vulcanized stocks are tested for their resistance to abrasion the values of which are given below:

|  | Relative wear |
|---|---|
| Blank | 135 |
| +reaction product | 158 |

*Example 3.*—The reaction product of acetone and phenyl beta-naphthylamine is made by heating an excess of acetone with phenyl beta-naphthylamine and a small quantity of iodine or other dehydrating agents at a temperature of 200° C. or higher during a prolonged time in an autoclave. At the end of this time excess of acetone and other low boiling materials are removed. It is advisable to remove unreacted phenyl-beta-napthylamine from the crude reaction product by distillation under vacuum. The product obtained in this way is a black paste having excellent antioxidant properties. It has been tested in a tire tread stock in the usual manner with the following results:

| Tensiles before ageing | Blank | +reaction product |
|---|---|---|
| 60′ at 45# | 4555 | 4195 |
| 75′ at 45# | 4550 | 3975 |
| 90′ at 45# | 4580 | 4050 |
| After ageing 96 hrs. in oxygen bomb | | |
| 60′ at 45# | 1165 | 3055 |
| 75′ at 45# | 1030 | 2875 |
| 90′ at 45# | 955 | 2650 |
| After ageing 158° F. for 3 weeks | | |
| 60′ at 45# | 1845 | 3095 |
| 75′ at 45# | 1545 | 3010 |
| 90′ at 45# | 1495 | 2835 |

In addition to being an excellent antioxidant this compound also imparts to tire tread stocks very good resistance to cracking under flexion.

The method of preparation of the reaction product of acetone and diphenyl guanidine is similar to that for the reaction product of acetone and phenyl beta-naphthylamine. It has proven to be a good anti-cracking agent for tire tread stocks. Reaction products of acetone and other substituted guanidines, such as phenyl o-tolyl guanidine and di-o-tolyl-guanidine may be prepared in a similar manner.

It is to be understood that a mixture of the reaction products may be used in rubber instead of a single reaction product. Also that a mixture of ketones or a single ketone may be reacted with a single amino compound or with a mixture of amino compounds to give products that may be used in rubber in the same manner.

The chemicals disclosed may be used to improve the properties as mentioned herein of inner tubes, tires, thread, hose, dipped goods, mechanical goods, latex or articles made from latex, etc.

In the claims the term "ketone" is to be understood as meaning organic compounds containing one or more keto groups

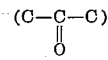

but containing no carboxylic acid

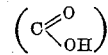

or ester groups

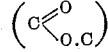

The term "rubber" is to be construed as including natural rubber, gutta percha, balata, synthetic rubber, or other rubber-like materials.

With the detailed description given above, it will be obvious that modifications will suggest themselves without departing from the principle of the invention, for example the product resulting from the reaction of a ketone and an aromatic amino compound may also be prepared by reacting the corresponding thio ketone or the corresponding ketone dihalide with the amino compound, and it is not desired to limit the invention otherwise than as set forth in the appended claims.

Having thus described my invention, what I claim and desire to protect by Letters Patent is:

1. The method of treating rubber which comprises treating rubber with the reaction product of a ketone and a compound comprising the group R—X—R′ in which R and R′ each comprise an aryl group and an amino group and X represents $S_x$, $C_nH_{2n}$ or $C=NH$, and small $x$ and $n$ represent whole numbers.

2. The method of treating rubber which comprises treating rubber with the reaction product of acetone and a compound comprising the group R—X—R′ in which R and R′ each comprise an aryl group and an amino group and X represents $S_x$, $C_nH_{2n}$ or $C=NH$, and small $x$ and $n$ represent whole numbers.

3. The method of treating rubber which comprises treating rubber with the reaction product of acetone and a compound comprising the group R—X—R′ in which R and R′ each comprise an aryl group and an amino group, and X represents $C_nH_{2n}$ or $C=NH$, and $n$ represents a whole number.

4. A process of treating rubber which comprises treating rubber with the reaction product of a ketone and a di(amino aryl) alkylene compound.

5. The method of treating rubber which comprises treating rubber with the reaction product of acetone and p—p' diamino diphenyl methane.

6. A method of improving the properties of rubber which comprises vulcanizing rubber in the presence of the reaction product of a ketone and a compound comprising the group R—X—R' in which R and R' each comprise an aryl group and an amino group and X represents $S_x, C_nH_{2n}$ or $C=NH$, and small $x$ and $n$ represent whole numbers.

7. A method of improving the properties of rubber which comprises vulcanizing rubber in the presence of the reaction product of acetone and a compound comprising the group R—X—R' in which R and R' each comprise an aryl group and an amino group and X represents $S_x, C_nH_{2n}$ or $C=NH$, and small $x$ and $n$ represent whole numbers.

8. A method of improving the properties of rubber which comprises vulcanizing rubber in the presence of the reaction product of acetone and a compound comprising the group R—X—R' in which R and R' each comprise an aryl group and an amino group, and X represents $C_nH_{2n}$ or $C=NH$, and $n$ represents a whole number.

9. A method of improving the properties of rubber which comprises vulcanizing rubber in the presence of the reaction product of a ketone and a di(amino aryl) alkylene compound.

10. A method of improving the properties of rubber which comprises vulcanizing rubber in the presence of the reaction product of acetone and p—p' diamino diphenyl methane.

11. A vulcanized rubber product resulting from the process set forth in claim 9.

12. A vulcanized rubber product resulting from the process set forth in claim 10.

13. A method of improving the properties of rubber which comprises incorporating therewith the reaction product of a dialkyl ketone and a compound comprising the group R—X—R' in which R and R' each comprise an aryl group and an amino group and X represents $S_x, C_nH_{2n}$ or $C=NH$, and small $x$ and $n$ represent whole numbers.

14. A method of improving the properties of rubber which comprises incorporating therewith the reaction product of an aliphatic ketone and a di(amino aryl) alkylene compound.

Signed at New York, county and State of New York, this 23d day of November 1929.

WILLEM P. TER HORST.